(12) United States Patent
Heanuc et al.

(10) Patent No.: US 6,781,927 B1
(45) Date of Patent: Aug. 24, 2004

(54) DATA STORAGE SYSTEM HAVING AN OPTICAL PROCESSING FLYING HEAD

(75) Inventors: John F Heanuc, Fremont, CA (US); Jeffrey P. Wilde, Los Gatos, CA (US); Jerry E. Hurst, Jr., San Jose, CA (US); John H. Jerman, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/436,943

(22) Filed: Nov. 9, 1999

Related U.S. Application Data (63) Continuation of application No. 08/851,379, filed on May 5, 1997, now Pat. No. 6,034,938
(60) Provisional application No. 60/025,801, filed on Aug. 27, 1996, provisional application No. 60/023,476, filed on Aug. 6, 1996, and provisional application No. 60/022,775, filed on Jul. 30, 1996.

(51) Int. Cl.$^7$ ............................................. G11B 11/00
(52) U.S. Cl. ................................ 369/13.32; 369/112.27
(58) Field of Search ........................... 369/13, 14, 121, 369/112, 44.23, 110, 117, 119, 44.37, 44.32, 112.27, 13.13, 13.31, 44.19, 112.29, 13.32, 13.28, 13.29, 13.56; 360/114, 77.03; 385/15–16, 31

(56) References Cited

U.S. PATENT DOCUMENTS

| | | | |
|---|---|---|---|
| 5,850,375 A | * 12/1998 | Wilde et al. | 369/14 |
| 5,903,525 A | * 5/1999 | McDaniel et al. | 369/13 |
| 5,940,549 A | * 8/1999 | Wilde et al. | 385/15 |
| 6,034,938 A | * 3/2000 | Heanue et al. | 369/13.56 |
| 6,044,056 A | * 3/2000 | Wilde et al. | 369/119 |
| 6,058,094 A | * 5/2000 | Davis et al. | 369/13.13 |
| 6,061,323 A | * 5/2000 | Jerman et al. | 369/112 |
| 6,081,499 A | * 6/2000 | Berger et al. | 369/112.27 |
| 6,226,233 B1 | * 5/2001 | McDaniel et al. | 369/13.32 |

* cited by examiner

*Primary Examiner*—Ali Neyzari
(74) *Attorney, Agent, or Firm*—Moser, Patterson & Sheridan, LLP

(57) ABSTRACT

An optical data storage and retrieval system uses a flying head. The flying head is supported on a moving media having information stored in a plurality of stored data locations thereon. Information is stored in each of the plurality of media locations as physical structures capable of modulating the polarization state of incident light into one of two output polarization states. The flying head includes an optical processing assembly which directs an incident light beam having a source polarization state onto the moving media, accessing successive data locations. A reflected light beam having the source polarization state of the incident light beam modulated by a respective polarization modifying data location into one of the output polarization states is received by the flying head. The optical processing assembly optically transforms the modulated output polarization state of the reflected light beam into two return light beams having differentially modulated intensity related to the output polarization state of the reflected light beam. The two intensity modulated return light beams are optically coupled to a distal differential detector which outputs digital data representing the stored data information for the subject data location. A preferred embodiment includes optical fibers for coupling the incident and return light beams between the detector and the flying head. The optical assembly of a preferred embodiment includes an optical plate having pre-shaped and dimensioned recesses for automatically locating and aligning multiple optical components comprising the assembly. The flying head may also include a servo-controlled micro machined mirror for directing the incident and reflected light beams to and from the media.

20 Claims, 7 Drawing Sheets

DATA STORAGE SYSTEM HAVING AN OPTICAL PROCESSING FLYING HEAD

CROSS REFERENCE TO RELATED APPLICATIONS

This patent application is a Continuation of U.S. patent application Ser. No. 08/851,379 filed May 5, 1997 now U.S. Pat. No. 6,034,938, which claims priority to U.S. Provisional Application Serial No. 60/022,775, filed Jul. 30, 1996, U.S. Provisional Application Serial No. 60/023,476 filed Aug. 6, 1996, and U.S. Provisional Application Serial No. 60/025,801 filed Aug. 27, 1996.

This application claims benefit of: Provisional Application Serial No. 60/022,775, entitled "A Data Storage And Retrieval System Based on Flying Magneto-Optical Head," filed on Jul. 30, 1996; Provisional Application Serial No. 60/023,476, entitled "A Data Storage And Retrieval System Based on A Flying Magneto-Optical Head," filed on Aug. 6, 1996; and Provisional Application Serial No. 60/025,801, entitled "A Data Storage And Retrieval System Based on A Flying Magneto-Optical Head," filed on Aug. 27, 1996. The subject matter of each of these related applications is incorporated herein by reference. All applications are commonly assigned. This application relates to U.S. patent application Ser. No. 08/844,208, entitled "Maximum Data Storage For Magneto Optical System," which was filed on Apr. 18, 1997. This application also relates to U.S. patent application Ser. No. 08/844,208, entitled "Data Storage System Having An Improved Surface Micro-Machined Mirror," which was filed on Apr. 18, 1997. All applications are commonly assigned. The subject matter of each of these related applications is incorporated herein by reference.

BACKGROUND OF THE INVENTION

1. Field of the Invention

The present invention relates generally to data storage systems having optical data tracking, storage and retrieval systems. More particularly, the present invention relates to data storage, tracking and retrieval systems that include optics.

2. Background Art

In data recording and retrieval systems, using a moving media having a varying material characteristic, detectable variations from previously encoded media locations may be retrieved using incident light reflected from the media. Such variations may also be used in providing servo control signals for following previously recorded data tracks.

In a magneto-optical storage system, using a magneto-optical (MO) recording material deposited on a rotating disk, information may be recorded on the disk as spatial variations of magnetic domains. During readout, the magnetic domain pattern modulates an optical polarization, and a detection system converts a resulting signal from optical to electronic format.

In one type of magneto-optical storage system, a magneto-optical head assembly is located on a linear actuator that moves the head linearly along a radial direction of the disk to position the head assembly over data tracks during recording and readout. A magnetic coil creates a magnetic field that has a magnetic component in a direction perpendicular to the disk surface. A vertical magnetization vector in the MO medium with polarity opposite to that of the surrounding magnetic material of the disk medium is recorded as a mark indicating zero or a one by first focusing a beam of laser light to form an optical spot on the disk. The optical spot functions to heat the magneto-optical material to a Curie point (i.e., a temperature at which the magnetization may be readily altered with an applied magnetic field). A current passed through the magnetic coil orients the spontaneous vertical magnetization vector into or out of the disk surface. This orientation process occurs in the region of the optical spot where the temperature is suitably high. The orientation of the magnetization mark is preserved after the laser beam is removed. The mark is erased or overwritten if it is locally reheated to the Curie point by the laser beam while the magnetic coil creates a magnetic field in the opposite direction.

Information is read back from a particular mark on the disk by taking advantage of the magnetic Kerr effect to detect a Kerr rotation of the optical polarization that is imposed on a reflected beam by the magnetization at the mark of interest, the magnitude of the Kerr rotation being determined by the material's properties (embodied in the Kerr coefficient). the sense of the rotation is measured by established differential detection schemes as being clockwise or counter-clockwise depending on the direction of the spontaneous magnetization at the mark of interest.

Winchester magnetic hard disk technology has historically been limited by at least two factors, including: magnetic head design and the magnetic storage media. A typical prior art magnetic storage system includes a magnetic head having a slider element and a magnetic read/write element and is coupled to a rotary actuator magnet and coil assembly by a suspension and rotary actuator arm so as to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator arm above the surface of the spinning magnetic disk.

Flying head designs have been proposed for use with magneto-optical (MO) storage technology. One motivation for using magneto-optical technology stems from the availability of higher areal density magneto-optical storage disks than magnetic storage disks. However, despite the historically higher areal storage density available for use with magneto-optical disks drives, the prior art MO disk volumetric storage capacity has generally not kept pace with the volumetric storage capacity of magnetic disk drives.

One factor limiting MO disk drives has been the physical size of the head necessary to hold the various components required for accessing magneto-optical information. Various MO flying head designs incorporating MO technology are described in U.S. Pat. No. 5,295,122 by Murakami, including: use of free-space alignment of a laser beam with a dynamically moving target, and a number of different configurations of the magnetic and optical elements required for detection of the magneto-optical Kerr effect. In Murakami, the large size and mass of the optical elements limits the minimum head size and, therefore: the speed at which information from the MO disk may be accessed, the tracking bandwidth, and the track density that may be read or written. In the prior art, the large physical size of MO flying heads also limits the spacing between magneto-optical disks to a finite minimum value and, therefore, limits the volumetric storage capacity which may be achieved.

A method for moving a folding prism or mirror with a galvanometer actuator for fine tracking has been disclosed by C. Wang in U.S. Pat. No. 5,243,241. The galvanometer consists of bulky wire coils and a rotatable magnet mounted on a linear actuator arm attached to a flying magneto-optical head, but not mounted on the slider body itself. This design limits the tracking servo bandwidth and achievable track density due to its size and weight. Its complexity also increases the cost and difficulty of manufacture.

Miniature torsional scanning mirrors have been described, viz, "Silicon Torsional Scanning Mirror" by K. Petersen, IBM J. Res. Develop., Vol. 24, No. 5 September 1980, pp. 631–637. These mirrors are generally prepared using procedures developed in the semiconductor processing arts. Petersen describes a torsion mirror structure having a 134 µm thick silicon wafer defining a distal frame suspending a central silicon mirror element suspended by lateral torsion members therebetween. The lateral mirror dimensions are about 2.1 by 2.2 mm. The mirror is bonded over a 7 to 10 µm deep etched well in a glass slide substrate, having evaporated electrodes deposited therein. The mirror is rotationally deflected by voltages applied between the mirror and the electrodes by connecting wires. Scanning angles of up to 2 degrees at a resonant operating frequency of up to 15 kHz were reported. The size and mass of the mirror limited higher operating frequency. Also, mirror distortion caused by the high dynamic torque (i.e. peak angular acceleration) at higher frequency was a limiting factor.

An improved magneto-optical storage system is described in commonly assigned U.S. patent application titled "Maximum Data Storage For Magneto Optical System", Ser. No.: 08/844,208 filed Apr. 18, 1997. The aforementioned application describes an RF modulated Fabry-Perot (FP) laser source that is coupled to a single optical fiber which directs the incident light to a servo controlled mirror for direction toward the disk. The mirror also directs a reflection of the incident light which carries rotated tracking and phase information from the disk. This system provides lower cost, mechanical simplicity and flexibility for the flying head and its suspension. The optical path for the incident and return light beam includes a single optical fiber connected between the flying head and remotely located fixed optical components. The optical components for optically processing the polarization state of rotated polarization components of the reflected optical signal are remotely disposed from the flying head, i.e., in the drive.

The remotely mounted optical components process the rotated polarization state of the return beam signal components and present resulting differential intensity beams to a differential detector. This method relies on preserving the polarization state of the oppositely rotated signal components in the return beam through the entire optical path, including the single optical fiber, to the optical processing elements. This system provides lighter, smaller flying heads which can yield improved system data density and/or storage capacity.

The advantages of the single fiber system are tempered by certain characteristics of RF modulated Fabry-Perot (FP) laser diodes combined with the birefringent nature of the polarization maintaining optical fiber used in the optical path. Birefringence is the characteristic of many optical materials in which the index of refraction (related to the velocity of light in the medium) depends on the direction of polarization of the propagating light in the material. This will cause a phase shift between orthogonally polarized waves proportional to the difference in the refraction indices times the path length divided by the wavelength.

The relatively broad spectrum of the RF modulated FP diodes produces a multi-wavelength incident light beam. Also the wavelengths present fluctuate with time (mode competition). The combination of fluctuating wavelengths passing through the single birefringent fiber produces signal components in the return beam whose polarization states are affected by the birefringent characteristics of the optical fiber. That is, the polarization angle of the return signal depends on the instantaneous wavelength of the incident and reflected beams. Since the wavelength may fluctuate about a center wavelength, the polarization state of the signal fluctuates accordingly. This fluctuation appears as noise in the differential detector. The noise limits the achievable data rate at a given signal level.

Optical fibers also experience polarization mode coupling/leakage. That is, as the light beam travels along the fiber, some of the parallel polarization component can appear as a perpendicular polarization component and vice versa. This polarization leakage will also appear at a distally located polarization detector as noise.

Light launched at a given wavelength and given polarization along an optical path having birefringent characteristics causes components along the principal axes to gradually become out of phase, i.e., polarization state of the traveling signal is not preserved. Any residual birefringent characteristic of an optical fiber will reduce signal detection sensitivity.

If the wavelength of light of a given polarization changes slightly at one end of an optical fiber, the polarization exiting other end will be slightly different from the other wavelength. Whereas, with no fiber, the polarization state would be the same for every wavelength. Therefore, if a returned polarization state is read by a polarization detector positioned at a remote end of a birefringent optical fiber, a fluctuating signal originating from the wavelength variations will be detected.

What is needed is an improved optical path for optical flying head storage systems that is compact and that allows an increase in the number of storage disks that can be placed within a given volume as compared to the prior art. The improved optical head should preferably provide a high numerical aperture, a reduced head mass, a very high resonance frequency tracking servo device, thus, producing a very fine track servo bandwidth, and be relatively easy to manufacture. Additionally, the flying optical head should improve upon: optical disk drive access times; data transfer rates; and access to, and use of, storage disk tracks, and provide for utilization of less expensive optical fiber material. The flying optical head also improves upon ease of manufacturability. Further, the improved optical head and optical path should provide reduced sensitivity to polarization mode coupling, and reduced sensitivity to laser diode mode competition.

SUMMARY OF THE INVENTION

It is an object of the invention to provide lower differential detector noise to enable increased data rates and storage densities with a given laser source bandwidth and/or optical fiber birefringence characteristic.

It is also an object of this invention to use lower cost laser diode sources and optical elements.

Yet another advantage of one preferred embodiment of the present invention is automatic position and alignment of critical optical components provided by photo lithographically defined component recesses formed in a flying head of the present invention.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein.

DETAILED DESCRIPTION OF A PREFERRED EMBODIMENT OF THE PRESENT INVENTION

Figure 1:
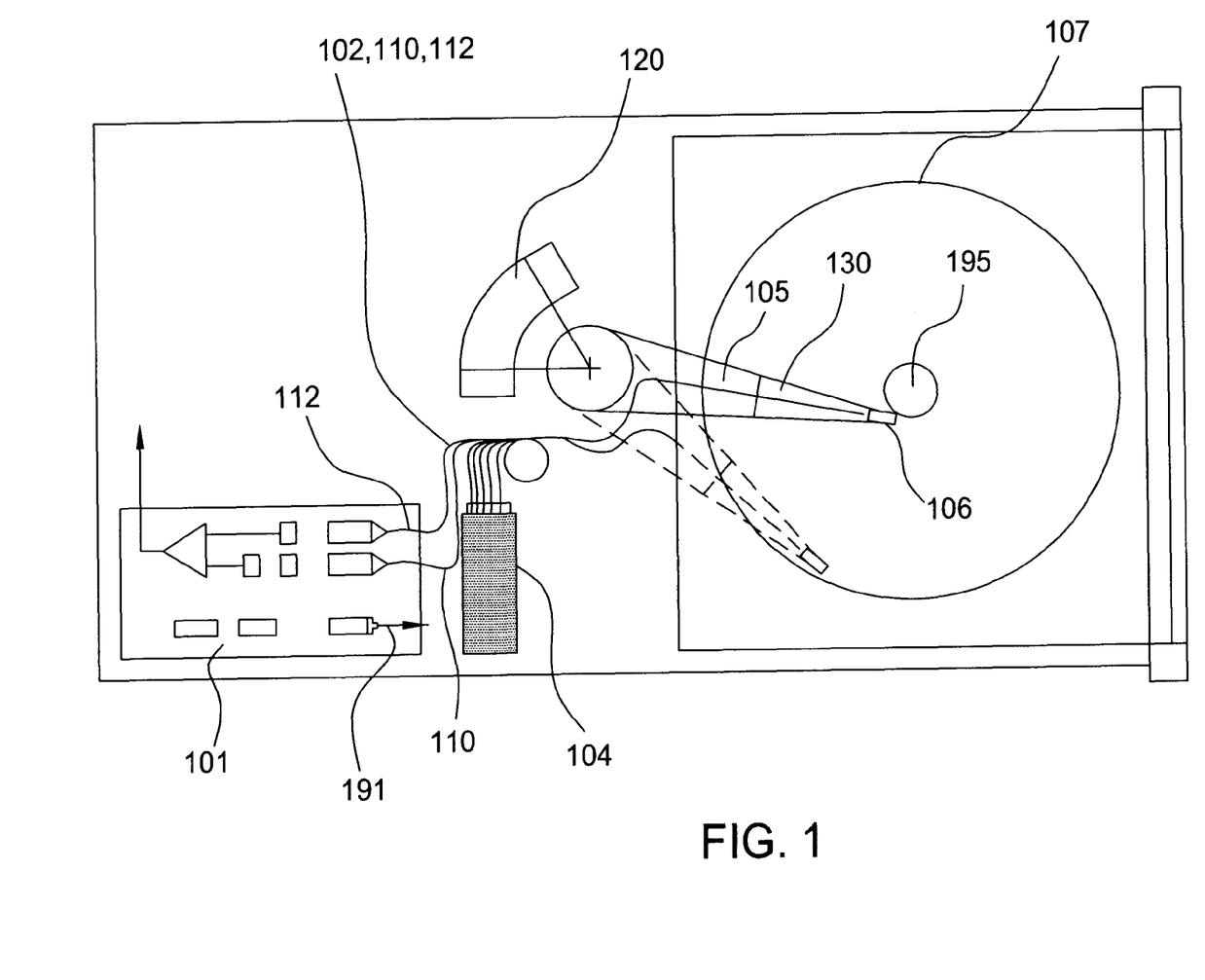
FIG. 1 shows a conventional optical data storage and retrieval system.

Referring in detail now to the drawings wherein similar parts of the invention are identified by like reference numerals, there is seen in FIG. 1 a diagram showing a magneto-optical data storage and retrieval system. In an exemplary embodiment, magneto-optical (MO) data storage and retrieval system 100 includes a set of Winchester-type flying heads 106 that are adapted for use with a set of double-sided first surface MO disks 107 (only one disk and one head shown). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor 195 so as to generate aerodynamic lift forces between the set of MO heads 106 and so as to maintain the set of MO heads 106 in a flying condition approximately 15 micro-inches above the upper and lower surfaces of the set of MO disks 107. The lift forces are opposed by equal and opposite spring forces applied by the set of suspensions 130. During the flying condition, the set of MO heads 106 are maintained between a minimum and maximum flying height over a full radial stroke of the actuator arm 105 above and below the surfaces of the set of MO disks 107 such that the set of MO heads 106 do not directly contact the set of MO disks 107 during normal operation. During non-operation, the set of MO heads 106 are maintained statically in a storage condition away from the surfaces of the set of MO disks 107.

System 100 further includes a laser-optics assembly 101 coupled to an optical switch 104. The simplified laser-optics assembly 101 provides an outgoing laser beam 191 (with reference to laser source 231), and distal ends of two separate sets of return signal coupling optical fibers 110, 112. A set of single-mode PM (polarization maintaining) optical fibers 102 are optically coupled through the optical switch 104 to the light source 191. Distal ends of two separate sets of return signal beam optical fibers 110, 112 are coupled to the assembly 101. In the exemplary embodiment, the set of optical fibers 102, 110, 112 are coupled through the set of actuator arms 105 and the set of suspensions 130 to a respective one of the set of MO heads 106.

Figure 2:
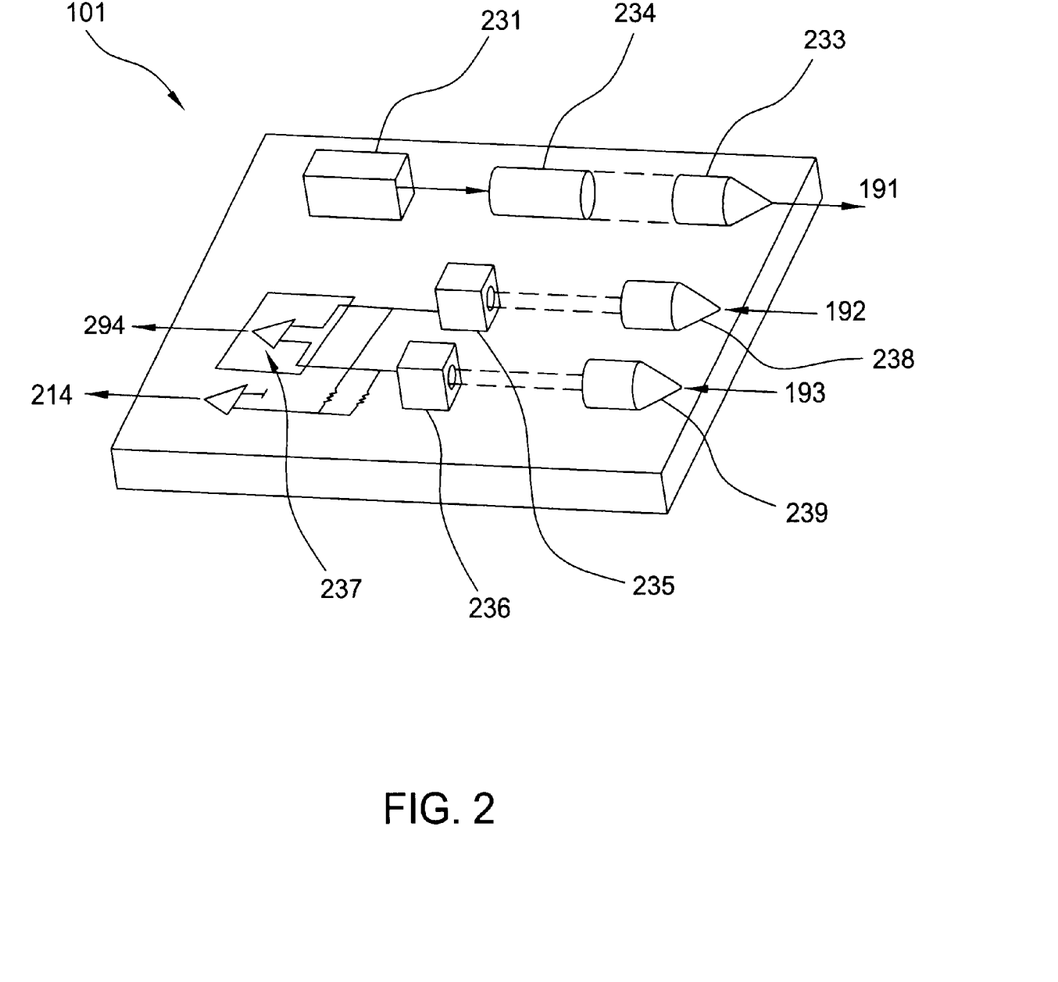
FIG. 2 is a schematic diagram of a simplified optics assembly of an embodiment of the present invention.

FIG. 2 is a diagram showing the laser-optics assembly 101 of the magneto-optical data storage and retrieval system of FIG. 1. In FIG. 2, the laser-optics assembly 101 is shown to include a linearly polarized Fabry-PEROT (FP) diode laser source 231 operating with an optical power sufficient for reading and writing using the set of MO disks 107. In a first embodiment the laser diode source may be an RF modulated laser source. One preferred diode provides a power of approximately 30–40 mw at a wave length of 650 nm+/−2 nm and with a RF amplitude modulation of about 300–400 MHz. The unmodulated spectral bandwidth is about +/−1 nm.

The laser-optics assembly 101 further includes: a first, a second and a third coupling lens 233, 238 and 239. The laser-optics assembly 101 directs a linearly polarized (LPL) outgoing laser beam 191 (from the linearly polarized laser source 231 shown in FIG. 1) towards the optical switch 104. The optical switch 104 directs the outgoing laser beam 191 to a distal end of a selected one of the set of optical fibers 102 and subsequently to a corresponding selected one of the set of disks 107.

In a first embodiment, two signal intensity modulated reflected laser beams 192, 193 from the selected one of the set of disks 107 (shown in FIG. 1) are directed by proximal ends of the respective ones of the sets of optical fibers 110, 112 to respective coupling lenses 238, 239. The reflected signal beams 192, 193 are directed respectively therefrom to an intensity sensitive differential detector comprising a set of photo-diodes 235, 236. Outputs from photo-diodes 235, 236 are connected to respective differential inputs of differential amplifier 237 which produces a first output signal 294 representing the stored information from the selected one of the disks 107.

The present invention is not meant to be limited to the aforementioned arrangement of optical elements, as other techniques for directing the outgoing laser beam 191 and for detecting the intensity of reflected laser beams 192, 193 are well known in the art.

Figure 3:
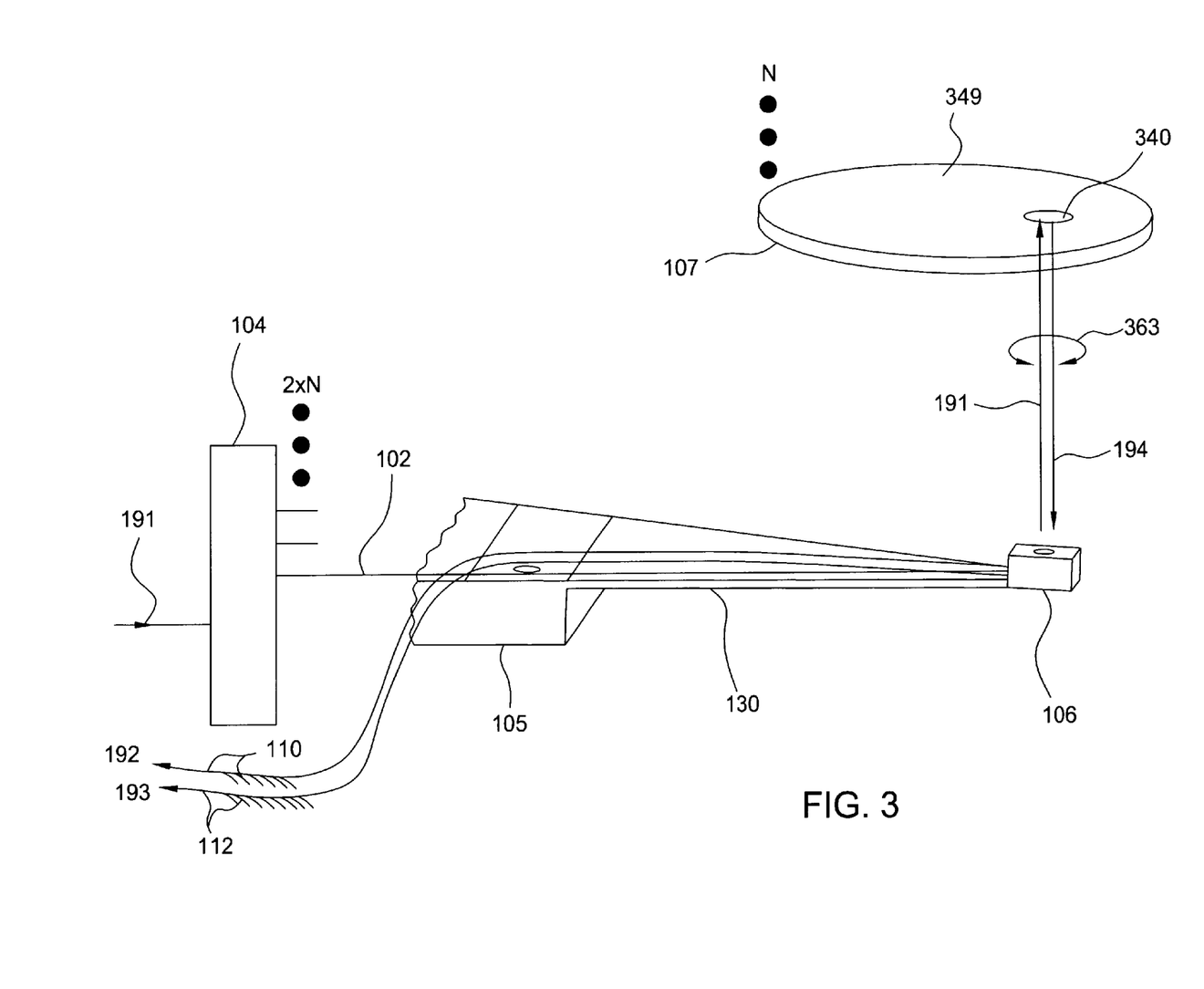
FIG. 3 illustrates the coupling of source and return light beams between the optics assembly and the flying head of FIG. 1.

FIG. 3 is a diagram showing a representative optical path that includes one of the optical fibers and the optical switch of the magneto-optical data storage and retrieval system of FIG. 1. A representative outgoing optical path is shown in FIG. 3 to include: the optical switch 104, one of the set of single-mode PM optical fibers 102, and one of the set of MO heads 106. The optical switch 104 provides sufficient degrees of selectivity for directing the outgoing laser beam 191 towards a respective single-mode PM optical fiber 102. The outgoing laser beam 191 is further directed by the single-mode PM optical fiber 102 to exit a respective distal end so as to pass through the MO head 106 onto a surface recording layer 349 of a respective MO disk 107.

During writing of information, the outgoing laser beam 191 is selectively routed by the optical switch 104 through the MO head 106 to the MO disk 107 and focused as an optical spot so as to lower a coercivity of the surface recording layer 349 by heating a selected spot of interest 340 to approximately the Curie point of the MO recording layer 349. Preferably, the optical intensity of outgoing laser beam 191 is held constant, while a time varying vertical bias magnetic field is used to define a pattern of "up" or "down" magnetic domains perpendicular to the MO disk 107. This technique is known as magnetic field modulation (MFM). Subsequently, as the selected spot of interest 340 cools at the surface layer 349, information embodied is encoded at the surface of the respective spinning disk 107.

During readout of information, the outgoing laser beam 191 (at a lower intensity compared to writing) is selectively routed to the MO disk 107 such that at any given spot of interest 340, the Kerr effect causes (upon reflection of the outgoing laser beam 191 from the surface layer 349) a reflected laser beam 194 to have a rotated polarization of either clockwise or counter clockwise sense 363 that depends on the magnetic domain polarity at the spot of interest 340.

Between the disk 107 and the MO head 106, the aforementioned outgoing optical path is bi-directional in nature. The MO head 106 is provided with optical elements (to be described below) that convert the polarization information recovered from the given spot of interest 340 into two separate distally directed return laser beams having differential intensity information.

Accordingly, the reflected laser beam 194 is received through the MO head 106 and is processed by the head 106 to generate the two separate return beams 192, 193. The beams 192, 193 enter respective proximal ends of the respective optical fibers 110 and 112. The reflected laser beams 192, 193 propagate distally along the optical fibers 110, 112. The reflected laser beams 192 and 193 exit separate sets of respective fibers 110, and 112 and are routed through the separate lenses 238 and 239 to respective detectors 235, 236 for subsequent conversion and output as the first output signal 294.

Use of optical fibers therefore provides a set of very low profile and low mass optical paths for accurate light delivery to and from a set of MO disks.

Figure 4:
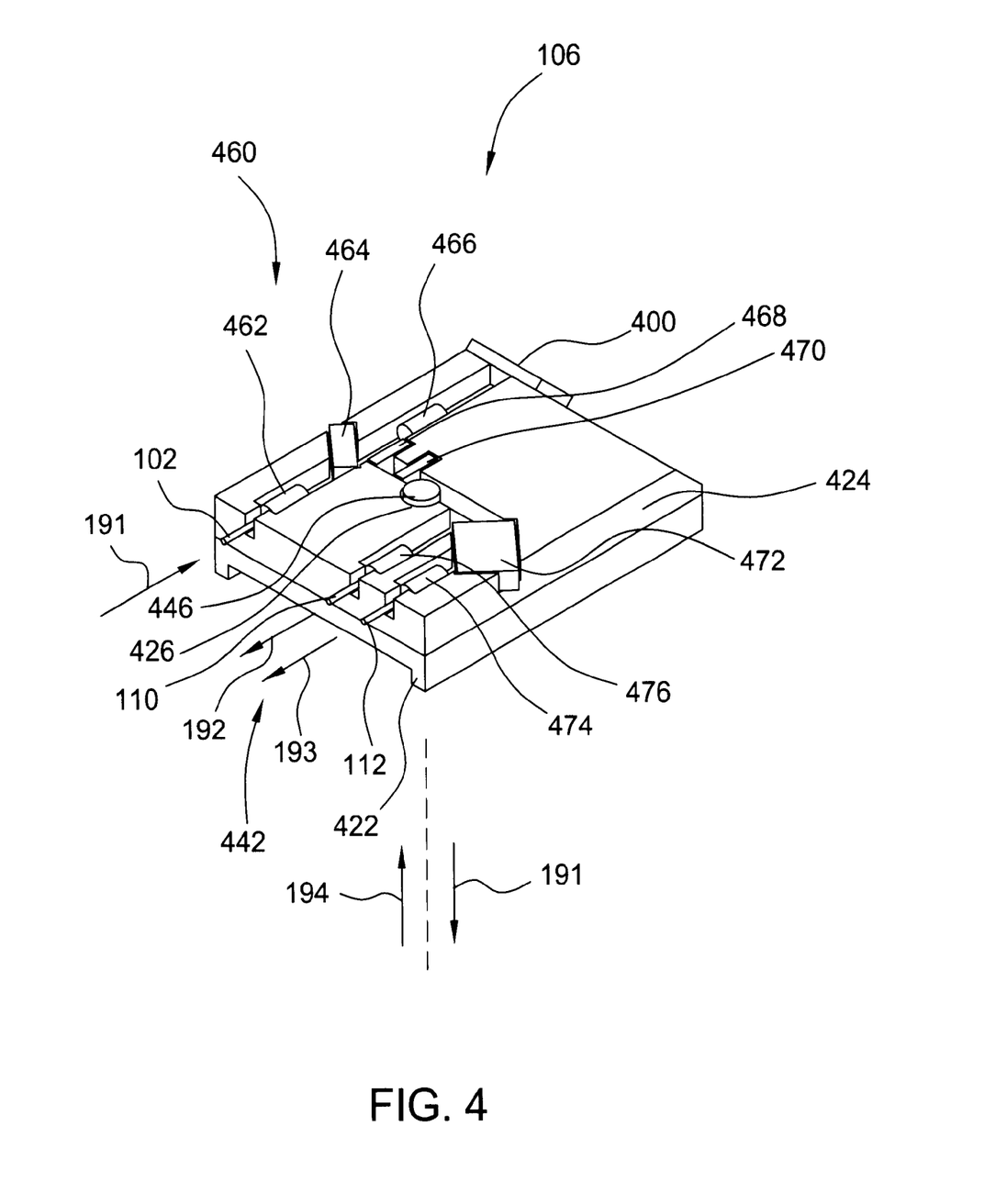
FIG. 4 is a perspective top view of an embodiment of the flying head of FIG. 3 showing some detail of the optical processing assembly of the present invention.
Figure 5:
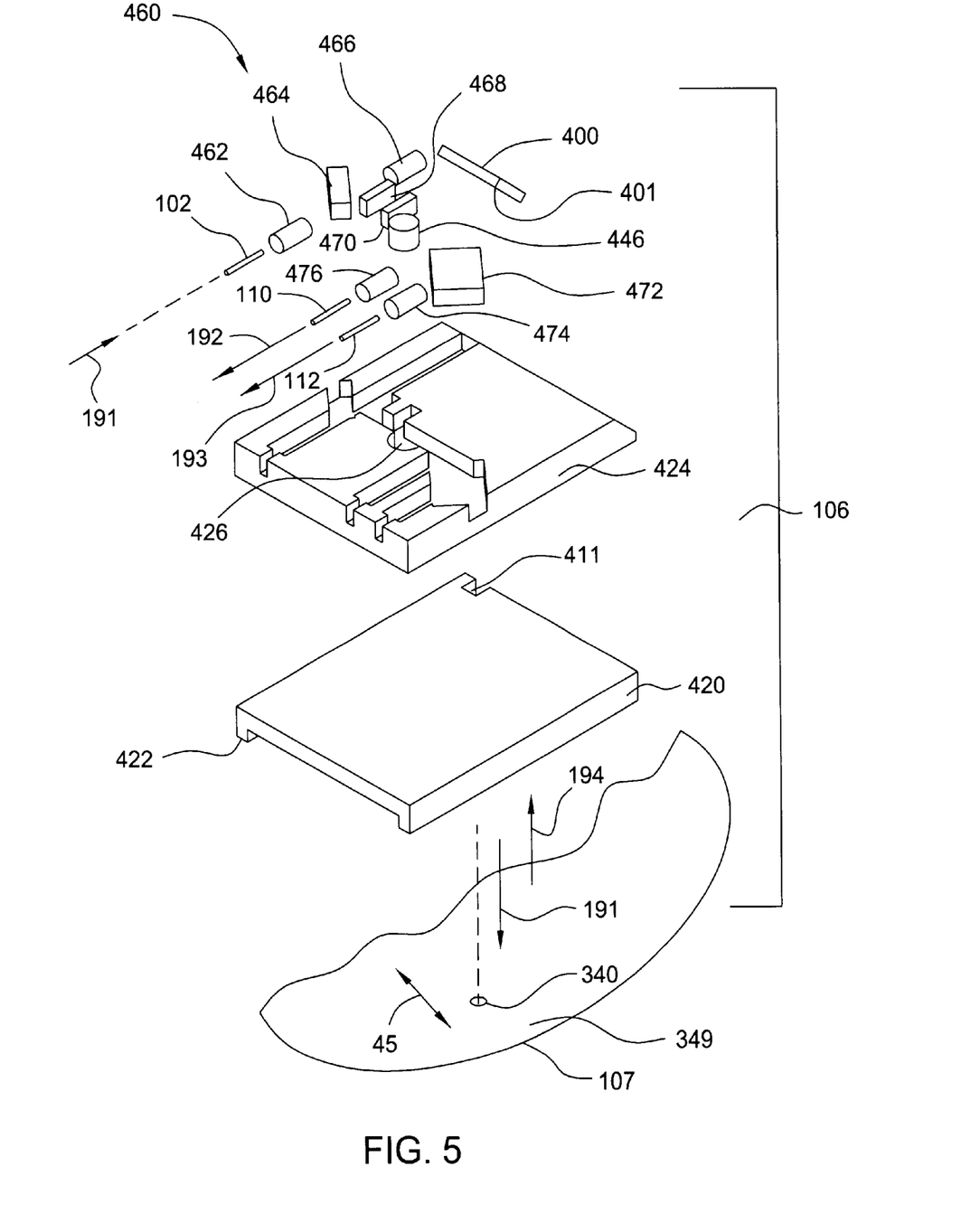
FIG. 5 is an exploded view of FIG. 4.

Referring now to FIG. 4 and FIG. 5 there is shown the optical processing flying magneto-optical head of the present invention in further detail. The MO head 106 of FIG. 4 is shown in an exemplary embodiment for use above or below a surface recording layer of one of the set of MO disks 107. The flying MO head 106 includes: a slider body 420, an air bearing surface 422, an optics mounting plate 424, a substrate 400, a set of optical elements 460, a suspension gimbal attachment 426 and a magnetic coil and yoke (not shown). In the preferred embodiment, the substrate 400 includes a reflective surface portion 401 (described in commonly assigned U.S. patent application Ser. No. 08/844,207, entitled "Data Storage System Having An Improved Surface Micro-Machined Mirror) which is aligned so as to direct the outgoing laser beam 191 and returning laser beam 194 to and from the surface recording layer 349.

The set of optical elements 460 includes: a collimating lens 462 that includes an optical lens central axis; a leaky beam splitter (LBS) 464 oriented at 45 degrees that includes: a first surface facing the collimating lens 462, and a parallel second surface facing a fiber imaging lens (FIL) 466; an objective lens 446; a birefringence compensator plate (BCP) 468; a ½ wave plate 470; a polarizing beam splitter (PBS) 472; and first and second output focusing lenses (OFL) 474, 476 that include respective central optical axes.

The collimating lens 462 is disposed on the optics mounting plate 424 between the proximal end of the single-mode PM optical fiber 102 and the LBS 464. The optical axis of the lens 462 is coaxial with the proximal end of fiber 102. The LBS 464 and the lens 462 are disposed such that lens 462 directs outgoing LPL exiting from the proximal end of fiber 102, (from the source 231 shown in FIG. 2), to produce outgoing collimated LPL incident on the first surface of the LBS 464. The LBS 464 is positioned such that the LPL exiting the proximal end of fiber 102 is centrally incident on the LBS 464 at the angle, φ1, relative to a surface normal perpendicular to the LBS 464 surface lying in a reference plane of incidence (POI) essentially parallel to the recording surface 349.

The LBS 464 includes a glass plate with a multilayer coating with a reflectance for LPL incident at the angle, φ1, such that transmission of LPL incident at the angle having an incident electric vector parallel to the POI (Eo∥) is approximately 80% at the second surface (reflectance for Eo∥ is approximately 20% at φ1) and transmission for LPL having an incident electric vector perpendicular to the POI (Eo⊥) is about 0% at the second surface (reflectance is essentially 100% for Eo⊥).

The incident LPL from the PM optical fiber 102 is arranged to be essentially all Eo∥ with respect to the POI so there is essentially no Eo⊥ transmitted into the LBS 464. Therefore, the transmission of Eo∥ is 80% and the transmission of Eo⊥ is essentially 0% through the LBS 464. This maximizes the potential signal magnitude to be reflected from the disk 107. The LBS 464 also minimizes polarization noise inherent in the use of a multi-mode laser source 231 to deliver light though the PM optical fiber 102 to the flying MO head 106.

The fiber 102, lens 462, LBS 464 and FIL 466 are positioned such that the portion of the source LPL transmitted through the LBS 464 (essentially all Eo∥) is refracted to exit the second surface of the LBS 464 and be directed toward the FIL 466 along its central axis. The 80% exiting Eo∥ polarized light constitutes the LPL to be acted upon by the recorded Kerr effect at the spot of interest 340.

The lens 466 is positioned between the second surface of the LBS and the substrate 400. The positioning of the lens 466 and substrate 400 is arranged such that an acceptably small image of the proximal end of the fiber 102 is projected onto the reflective surface portion 401 and reflected therefrom through the objective lens 446 towards the disk 107 as a focused optical spot.

Compared to the case where the imaging lens 466 would not be used, the inclusion of the imaging lens 466 in the optical path between the LBS 464 and detectors and the reflective surface portion 401 provides for reduced lateral dimensions of the reflective surface portion 401.

The outgoing LPL beam 191 retains the Eo∥ orientation after reflection from the reflective surface portion 401 and transmission through the objective lens 446. The LPL beam 191 then reflects off the encoded spot of interest 340 and returns as reflected LPL beam 194 carrying a reflected parallel (Eo∥r) polarization vector component (with respect to the reference POI) and a perpendicular signal vector component (Es⊥). The Es⊥ vector component corresponds to Kerr effect polarization rotation information encoded on the disk 107 of about +/−1 deg. The returning reflected LPL beam 194 then reflects again off reflective surface portion 401 and is directed distally through the imaging lens 466 toward the second surface of the LBS 464.

The Es⊥ vector signal is oriented with polarization along either one direction perpendicular to the POI (e.g., up) or along the opposite direction perpendicular to the POI (e.g. down) depending on the direction of magnetization at the spot of interest 340.

The second surface of the LBS 464 provides a reflectance of about 20% for the returning Eo∥r component of the LPL beam 194 (i.e. about 80% transmission) and about 100% for the Es⊥ vector portion of the returning beam 194. Both reflected components Eo∥r and Es⊥ are directed by the LBS 464 second surface toward the compensating plate 468. The second surface of the LBS 464 serves to increase the relative magnitude of the Es⊥ signal component relative to the Eo∥r reference component of the reflected beam 194.

The compensator plate 468 is disposed to intercept and transmit therethrough the 100% reflected portions of the Es⊥ signal component and the 20% Eo∥r reference component of the reflected beam 194. The plate 468 is arranged to provide compensation for birefringent effects introduced by the reflective surface portion 401 thereby retaining the relative polarization information obtained from the disk 107.

The ½ wave plate 470 is disposed to intercept and transmit therethrough the 100% reflected portions of the Es⊥ signal component and the 20% Eo∥r reference component of the reflected beam 194 received from the compensator plate 468. The ½ wave plate 470 has an optical axis aligned at about 22.5 degrees with respect to the reference POI and is arranged to rotate the polarization of incident LPL 45 deg relative to the incident LPL orientation.

After the compensator plate 468, the LPL includes a reference component Eo∥r and a signal component +/−E⊥, where the sign depends upon the direction of the Kerr rotation. The ½ wave plate 470 rotates the polarization so that the light incident on the PBS 472 has a component polarized in the plane of incidence given by $Et\| = 1/\sqrt{2}(Eo\|r+/-Es\bot)$ and a component polarized perpendicular to the POI given by $Et\bot = 1/\sqrt{2}(Eo\|r-/+Es\bot)$. The PBS 472 reflects close to 100% of the perpendicular polarization Et⊥ and that light is coupled into the first output lens 474. The parallel component Et∥ propagates through the PBS 472 and is coupled into the second output lens 476. The intensity into the first output lens 474 is proportional to $|Et\bot|^2 = |1/\sqrt{2}(Eo\|r+/-Es\bot)|^2$ and the intensity of light into the second output lens 474 is proportional to $|Et\||^2 = |1/\sqrt{2}(Eo\|r-/+Es\bot)|^2$. Thus the difference signal gives the sign of the Kerr rotation.

Figure 6:
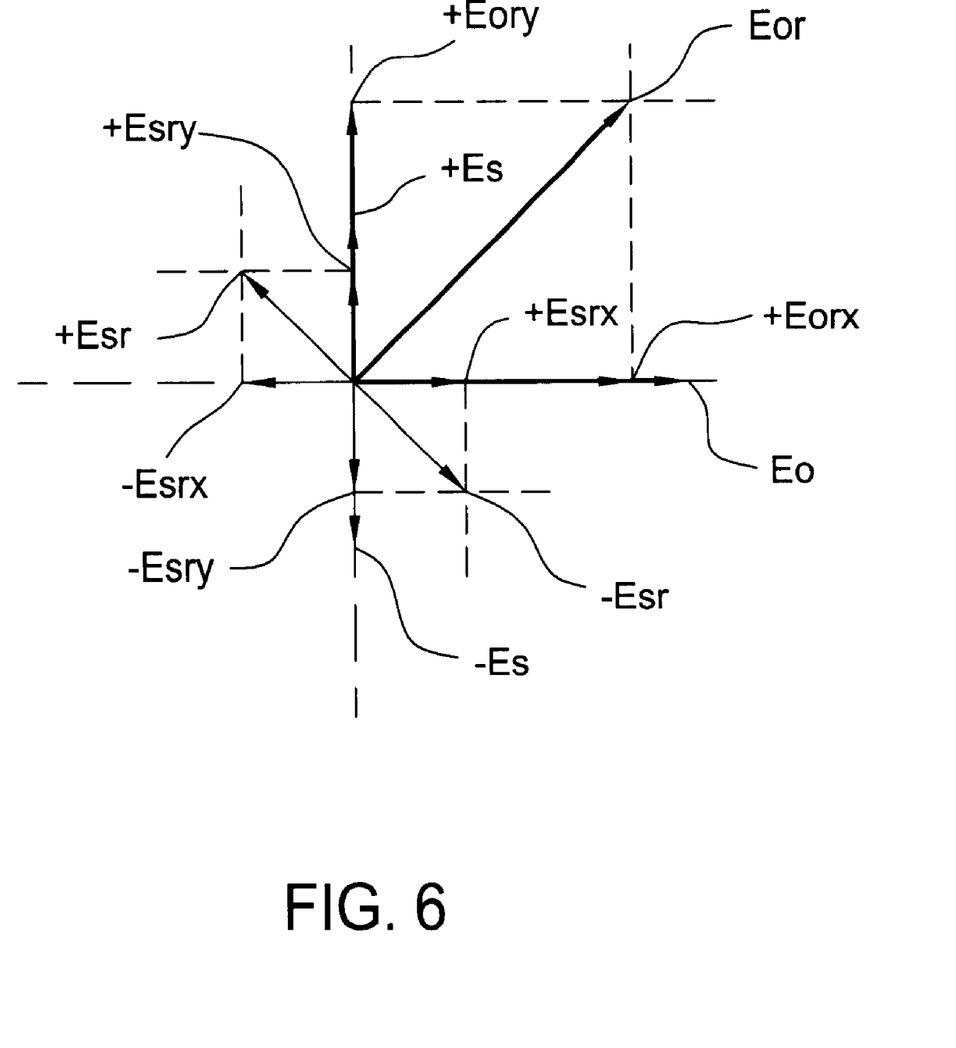
FIG. 6 is a graph depicting the transformation of the polarization encoded signal information from the disk into differential intensity information by the processing assembly shown in FIGS. 4 and 5 for coupling to the distally disposed detector.
Figure 7:
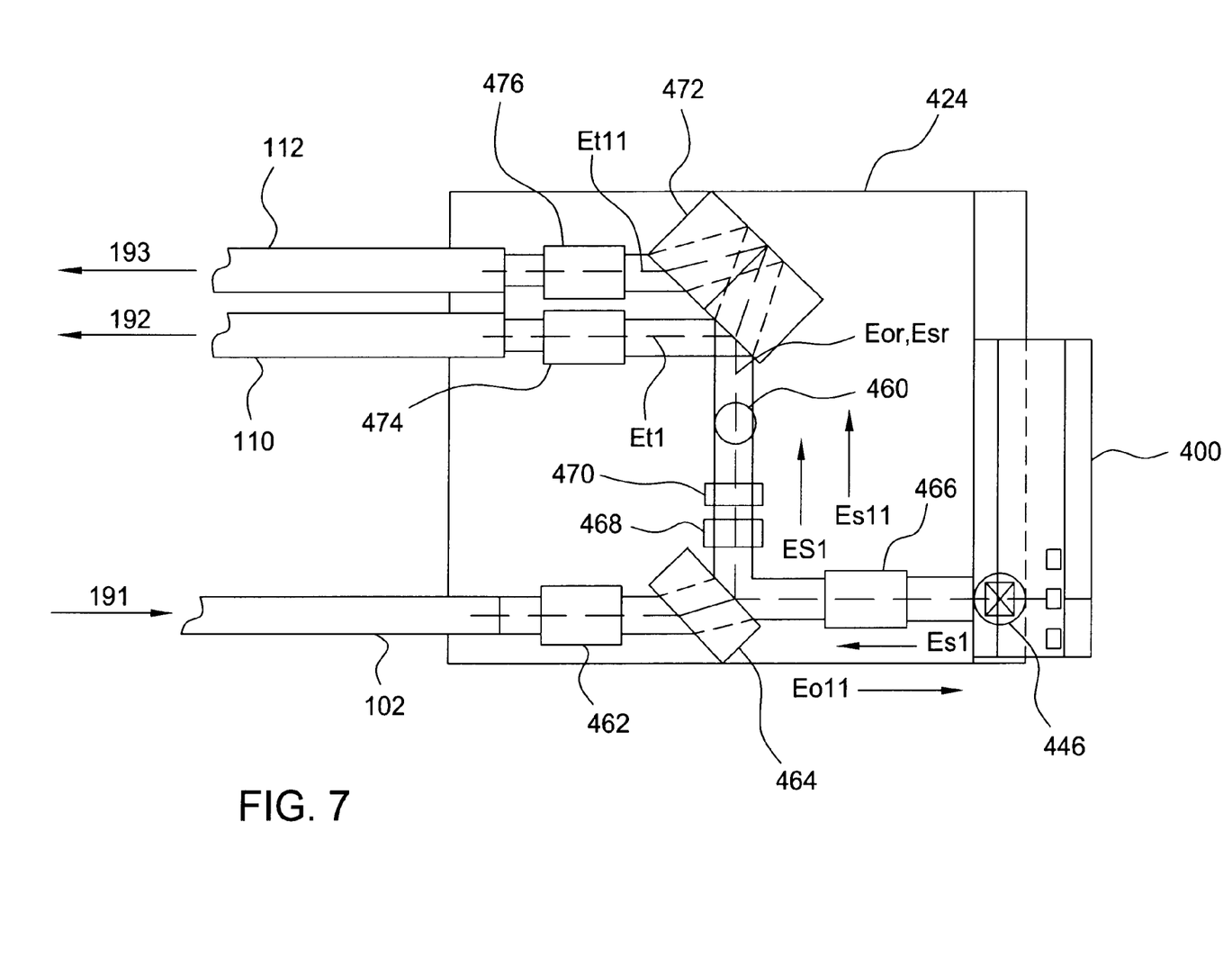
FIG. 7 is a detail plan view of the flying head optical processing assembly of the present invention.

FIG. 6 is a pictorial example of the relation between in-plane and out-of-plane polarization components and how they are rotated by the ½ wave plate 470. FIG. 6 also indicates how the polarization data of the π/4 rotated perpendicular return signal component is combined with the polarization data of the π/4 rotated parallel reference component to form output light beams 192 and 193 having only intensity differences for transmission to the remotely mounted differential detector diodes 235, 236. In FIG. 6, Eo represents the in-plane, i.e., parallel, component of the source light which is reflected from the subject spot of interest 340 on the disk 107. +ES, −Es represent the two possible states of the perpendicular signal component. Eor represents the π/4 rotation of vector Eo by the ½ wave plate 470. Esr represents the π/4 rotation of vector Es by the same ½ wave plate 470. The vectors Eor and Esr are resolved into parallel and perpendicular components Eorx, −/+Esrx, and Eory, +/−Esry, respectively, which are summed respectively by the second surface and first surface of PBS 472. The difference between the sign relationships for the parallel and perpendicular components results in the differential intensity relationship between the two output beams 192 and 193.

The PBS 472 includes a polarizing front surface and a reflectively coated internally reflecting back surface separated by a thickness Tpbs. The BPS 472 is positioned to receive the reflected and rotated LPL beam 194 from the ½ wave plate 470, and output essentially the summed vectors Et∥ and Et⊥ into output coupling lenses 474 and 476. The front surface of the PBS 472 is arranged to reflect essentially all of incident LPL beam 194 which has polarization oriented perpendicular to the reference POI, i.e., all of Et⊥.

The first output lens 474 is aligned and positioned to receive substantially all of the rotated and reflected LPL beam 194 which is reflected from the PBS 472 front surface, i.e., all of beam comprising the reflected Et⊥ component. This comprises essentially all of the return signal beam 192.

Signal beam 192 is transmitted by output lens 474 to a proximal end of optical fiber 110. The proximal end of fiber 110 is aligned and positioned with respect to the output lens 474 to receive substantially all of the signal beam 192 and optically couple it distally to the coupling lens 238 located distally in the simplified system optical drive This comprises the first returned signal intensity modulated beam 192 of FIGS. 2 and 3 carried by optical fiber 110.

Further, the front surface of the PBS 472 is arranged to firstly refract and transmit therein, toward the spaced away internal second surface, essentially all of the incident LPL beam 194 which has electric vector polarization oriented parallel to the reference POI, i.e. all of Et∥. The firstly refracted portion of Et∥ of LPL 194 then reflects from the spaced away internally reflecting second surface of the PBS 472 and is directed toward the front surface of the PBS 472 to be secondly refracted thereat.

Essentially all of the secondly refracted LPL 194 portion Et∥ is directed outward toward the spaced apart second output lens 476. The second output lens 476 is aligned and positioned to receive substantially all of the rotated and secondly refracted LPL beam 194 portion, i.e., all of Et∥. This comprises the second returned signal intensity modulated beam 193 of FIGS. 2 and 3 carried by optical fiber 112.

By the means described above, the information within the spot of interest 340 is embodied as polarization information in the reflected beam 194 and is converted to a difference in intensity information between two physically separated light beams 110, 112 by output circuitry associated with the photo-diodes 235, 236. It is understood, however, that in an alternative embodiment the two detection photo-diodes 235, 236 could be provided on the flying MO head 106

The present embodiments have been described in terms of GRIN lenses. Other lens elements such as molded glass bi-asphere lenses may be used for the objective lens 446 and molded plastic lenses may be used for the lenses 462, 446, 474, and 476.

With reference to FIG. 5, there is shown an exploded top view of one preferred embodiment of the flying head of the present invention. The optics mounting plate 424 is provided with respective recesses correspondingly shaped, dimensioned and positioned to accept the lens components 462, 466, 466, 474, and 476, the leaky beam splitter 464, the compensator plate 468, the ½ wave plate 468 and the polarizing beam splitter 472 (the components of the optics processing assembly 460) in the aforementioned relationships. In like manner, the optical fibers 110, 112, 102 are provided with corresponding receiving recesses, e.g. grooves or channels in the optics plate 424 aligned and positioned as described. The optical components 460 may be fixed in place in their respective recesses by a suitable epoxy or adhesive.

Recess dimensions may be easily controlled to within +/− a few microns. Provision may be made for axial positioning of lens components. For example, the imaging lens 466 may be provided with a recess having a closely fitting channel diameter to tightly position the lens 466 radially with respect to the optical axis, but may have axial freedom to change the focus of the distal end of the input fiber 102 on the reflective surface portion 401.

The size and spacing of the optical assembly components is such that the footprint of the MO head 106 over the disk 107 remains quite small. The optical assembly components may be placed quite closely, on the order of 150 microns to 400 microns preserving a small footprint for the MO head 106. For example, one embodiment of the MO head 106 includes a slider body portion 420 that is approximately 0.54 mm in height, 2.8 mm in length, and 2.2 mm in width and a optics plate portion 424 that is approximately 0.40 mm in height, 2.8 mm in length, and 2.2 mm in width.

A preferred material for the optical plate 424 is silicon, as photo lithographic processes are readily available for high precision definition of such component receiving recesses. It is anticipated that the axial, angular and lateral tolerances for defining recesses for receiving the optical components 460 are achievable with conventional silicon processing and will provide suitable positioning and alignment of the various optical assembly components with minimal or no adjustment required.

Suitable optical components for the optical components 460 include: gradient index (GRIN) lenses for the lenses 462, 466, 446, 474 and 476 with a 400 micron length by 250 micron diameter lenses from NSG America, New Jersey having a base index of about 1.643 and gradient index constant of about 2.319 $mm^{-1}$; a leaky beam splitter 464 such as BK-7 glass with a multi layer LBS coating given a leak ratio of about 80%/20%, having a thickness of about 250 micron and lateral dimension 500 micron and height of 250 micron made by Lambda Research Optics, Los Angeles, Calif.; a compensator plate 468 of quartz made by Virgo Optics, Fla., having a thickness from about 77 microns, and about 250 microns in width, and 250 microns in height; a birefringent ½ wave plate 470 of quartz having a thickness of about 108 micron, a width of about 250 micron and height of about 250 micron; a beam splitter 472 having a polarizing front surface multi-layer coating and a reflective second surface coating on a approximately 400 micron thick glass substrate.

The laser source optical fiber 102 is preferably a polarization maintaining optical fiber. The signal return fibers 110, 112 may be multi-mode fibers since they carry only intensity information. The diameter of the three fibers 102, 110, 112 may be reduced to provide equivalent mechanical load on the flying head 106 as compared to the single fiber prior art approach as the head 106 flies over the disk 107.

The objective optics 446 is coupled to the slider body 420 generally toward a vertical corner within a cutout 411. Although, in a preferred embodiment the vertical cutout 411 is located towards a corner of the slider body 420, those skilled in the art will recognize that the vertical cutout 411 may be located at other positions on the flying MO head 106, for example, towards a central axis more generally than a periphery or, alternatively, along the central axis. Those skilled in the art will recognize that positioning the optical fiber 102 and the objective optics 446 at other than along a central axis, may function to affect a center of mass of the magneto-optical head 106 and, thus, its flying dynamics. Accordingly, the gimbal attachment 426 point on the MO head 106 to the suspension 130 may require adjustment to compensate for off-center changes in the center of mass of the magneto-optical head 106.

In the preferred embodiment, the outgoing laser beam 191 traverses a one-way optical path (to the surface recording layer 349 of the MO disk 107) that includes only the fiber 102, the lens 462, the LBS 464, the imaging lens 466, the substrate 400, and the objective optics 446. In the preferred embodiment, the single-mode PM optical fiber 102 and the objective optics 446 are positioned within their respective cutouts to achieve focus of the outgoing laser beam 191 within the spot of interest 340. The substrate 400, and optical elements 460 are preferably compact and low mass so as to fit within a physical volume approximating the rectangular volumetric dimensions of the slider body 420 and yet sufficiently large to direct a full cross section of the outgoing and reflected laser beams 191 and 194 so that minimal power is lost and significant distortion and aberrations in the outgoing and reflected laser beams 191 and 194 are not introduced.

In an exemplary embodiment, described in the previously mentioned commonly assigned U.S. patent application Ser. No. 08/844,207, entitled "Data Storage System Having An Improved Surface Micro-Machined Mirror," the substrate 400 may comprise a steerable micro-machined mirror assembly. As used in the magneto-optical storage and retrieval system 100, fine tracking and short seeks to a series of nearby tracks may be performed by rotating a reflective surface portion 401 (not shown) about a rotation axis so that the propagation angle of the outgoing laser beam 191 is changed before transmission to the objective optics 446. The reflective surface portion 401 is rotated by applying a differential voltage to a set of drive electrodes. The differential voltage on the electrodes creates an electrostatic force that rotates the reflective surface portion 401 about a set of axial hinges and enables the focused optical spot to be moved in a radial direction of the MO disk 107. In an exemplary embodiment, a rotation of reflective surface portion 401 is approximately +/−2 degrees or equivalently a track pitch of approximately +/−4 tracks on the MO disk 107, in a direction 450 that is approximately parallel to the radial direction of the MO disk 107. Consequently, movement of the focused optical spot across the MO disk 107 and detection of the reflected laser beam 194 may be used in storage and retrieval of information, track following, and seeks from one data track to another data track. Coarse tracking may be maintained by adjusting a current to rotary actuator magnet and coil assembly 120. The track following signals used to follow a particular track of the MO disk 107 may be derived using combined coarse and fine tracking servo techniques that are well known in the art. For example, a sampled sector servo format may be used to define tracks. The servo format may include either embossed pits stamped into the MO disk 107 or magnetic domain orientations that are read similar to data marks. For example, a sampled sector servo format may be used to define tracks. The servo format may include either embossed pits stamped into the MO disk 107 or magnetic domain orientations that are read similar to data marks. If embossed pits are used, those skilled in the art will recognize that the outputs from the photo-diodes 235, 236 would be summed to obtain an intensity output signal 214 in addition to the differential output circuit 237. Those skilled in the art will recognize that conventional prior art multiple disk Winchester magnetic disk drives use a set of respective suspensions and actuator arms that move in tandem as one integral unit. Therefore, because each flying head of such an integral unit is fixed relative to another flying head, during track following of a particular magnetic disk surface, simultaneous track following of another magnetic disk surface is not possible. In contrast, irrespective of the movement of the set of actuator arms 105 and set of suspensions 130, use of a substrate 400 with each of a set of flying MO heads 106 permits track following and seeks so as to read and/or write information using more than one disk surface at any given time. Independent track following and seeks using a set of concurrently operating reflective surface portions 401 would preferably require a set of separate respective read channels and fine track electronics and mirror driving electronics. Because the aforementioned embodiment would also preferably require use of separate laser-optics assemblies 101, an optical switch 104 for switching between each of the separate optical paths would not necessarily be required.

While the foregoing detailed description has described the embodiments of the present invention in accordance with this invention, it is to be understood that the above description is illustrative only and not limiting of the disclosed invention. It will be appreciated that it would be possible to modify the size, shape and appearance and methods of manufacture of various elements of the invention or to include or exclude various elements within the scope and spirit of this invention. For example more than one mirror could be used to direct outgoing and return light beams. One having the necessary skill in the art may choose alternate beam splitters that may be quite different from those described. Alternate lens types and shapes, prisms, mirrors, and the like and other optical elements may be combined to provide polarization beam splitting and direction still within framework of this invention. Thus the invention is to be limited only by the claims as set forth below.

What is claimed is:

1. An optical head for directing polarized light, comprising:
    a separate optics assembly, wherein said optics assembly is adapted to be disposed on a slider body and wherein said optics assembly comprises an optics mounting plate supporting at least one optical coupler for directing said polarized light between a source and a destination, said source comprising a laser and said destination comprising a data storage surface of an MO disc, wherein said at least one optical coupler comprises a polarization maintaining optical fiber for directing said light to said disc and one or more multi-mode optical fibers for returning said light from said disc.

2. The optical head as recited in claim 1, wherein said optical coupler maintains a polarization state of said polarized light.

3. The optical head as recited in claim 1, wherein said optics assembly comprises at least one recess for holding elements of said optical coupler, wherein said at least one recess is formed in said optics assembly using silicon processing techniques.

4. The optical head as recited in claim 2, wherein said polarization maintaining optical fiber comprises a single-mode polarization maintaining optical fiber.

5. The optical head as recited in claim 4, wherein said optical fiber for returning said light comprises at least one multi-mode optical fiber in a separate recess in said optics mounting plate.

6. The optical head as recited in claim 1, wherein said source comprises a storage media and said destination comprises at least one photo detector.

7. The optical head as recited in claim 3, wherein a beam splitter is disposed on said optics assembly to direct said returning light to said one or more multi-mode fibers.

8. The optical head as recited in claim 1, wherein said slider body comprises an outermost periphery and wherein said optics assembly is coupled to said slider body on said periphery, said slider supporting said mounting plate to fly over said storage surface and align said light from said optical coupler with a track on said disc.

9. The optical head as recited in claim 10, wherein said movable mirror dynamically directs said light between said fiber and said destination.

10. The optical head as recited in claim 1, wherein said at least one optical coupler comprises a movable mirror supported on said mounting plate.

11. The optical head as recited in claim 1, wherein said at least one optical coupler comprises a micro-machined mirror.

12. The optical head as recited in claim 1, wherein said optics assembly comprises an outermost periphery, wherein said optical coupler is disposed along said periphery.

13. The optical heads recited in claim 12, wherein said mirror is supported adjacent a vertical surface of said optics assembly.

14. The optical head as recited in claim 13, wherein said optical coupler comprises a GRIN lens.

15. The optical head as recited in claim 14, wherein said GRIN lens comprises: a plano surface, a convex surface, and a diameter less than 0.250 microns.

16. The optical head as recited in claim 11, wherein said optical coupler comprises a beam splitter to receive said reflected light and direct it to said multi-mode fiber.

17. The optical head as recited in claim 16, wherein said beam splitter includes an LBS coating.

18. The optical head as recited in claim 2, wherein said slider body comprises an outermost periphery and wherein said optical coupler is supported on said slider body on said periphery.

19. The optical head as recited in claim 1, wherein said optics assembly comprises at least one recess for holding elements of said optical coupler, wherein said at least one recess is formed in said optics assembly using silicon processing techniques.

20. An optical head for directing polarized light, comprising:
    a separate optics assembly, wherein said optics assembly is adapted to be disposed on a slider body and wherein said optics assembly comprises an optics mounting plate supporting at least one optical coupler for directing said polarized light between a source and a destination, said source comprising a laser and said destination comprising a data storage surface of an MO disc, wherein said at lest one optical coupler comprises means for directing polarized light to and returning multi-mode light from the disc.

* * * * *

UNITED STATES PATENT AND TRADEMARK OFFICE
CERTIFICATE OF CORRECTION

PATENT NO. : 6,781,927 B1 Page 1 of 1
DATED : August 24, 2004
INVENTOR(S) : Heanue et al.

It is certified that error appears in the above-identified patent and that said Letters Patent is hereby corrected as shown below:

Title page,
Item [75], Inventors, please change inventor name "Heanuc" to -- Heanue --.

Signed and Sealed this

Twenty-fifth Day of October, 2005

JON W. DUDAS
*Director of the United States Patent and Trademark Office*